(12) United States Patent
Sterchi

(10) Patent No.: US 8,528,655 B1
(45) Date of Patent: Sep. 10, 2013

(54) MULTI-FUNCTION IMPLEMENT SYSTEM

(76) Inventor: David N. Sterchi, South Pittsburg, TN (US)

( * ) Notice: Subject to any disclaimer, the term of this patent is extended or adjusted under 35 U.S.C. 154(b) by 0 days.

(21) Appl. No.: 13/487,503

(22) Filed: Jun. 4, 2012

(51) Int. Cl.
*A01B 49/02* (2006.01)

(52) U.S. Cl.
USPC .......................................... 172/136; 172/420

(58) Field of Classification Search
USPC ................... 172/34, 133, 136, 251, 254, 662, 172/799.5, 240, 395, 407, 420; 37/404–410; 56/400.04–400.06
See application file for complete search history.

(56) References Cited

U.S. PATENT DOCUMENTS

| | | | | |
|---|---|---|---|---|
| 176,963 A * | 5/1876 | Johnson | | 172/529 |
| 389,259 A * | 9/1888 | Spradlin | | 172/136 |
| 558,492 A * | 4/1896 | Hick | | 172/136 |
| 1,188,827 A | 6/1916 | Poulter | | |
| 1,316,878 A * | 9/1919 | Cowdery | | 172/136 |
| 1,341,231 A * | 5/1920 | Hamilton | | 172/136 |
| 1,346,701 A * | 7/1920 | Cochran | | 172/529 |
| 1,643,567 A * | 9/1927 | Van Arsdale | | 172/136 |
| 1,652,012 A * | 12/1927 | Johnson | | 172/136 |
| 2,518,051 A * | 8/1950 | Nelson | | 172/256 |
| 2,578,131 A * | 12/1951 | Gannon | | 172/136 |
| 4,615,396 A | 10/1986 | Arnold | | |
| 4,898,247 A * | 2/1990 | Springfield | | 172/799.5 |
| 4,945,996 A | 8/1990 | Codding | | |
| 5,094,299 A * | 3/1992 | Freier | | 172/1 |
| 5,350,020 A | 9/1994 | Vandever | | |
| 6,996,925 B2 * | 2/2006 | Harding | | 37/405 |
| 7,575,067 B1 * | 8/2009 | Reyes | | 172/684.5 |
| 2009/0020369 A1 | 1/2009 | Warachka | | |
| 2009/0288847 A1 | 11/2009 | Quiring | | |

\* cited by examiner

*Primary Examiner* — Matthew D Troutman
(74) *Attorney, Agent, or Firm* — Jason L. Gilbert

(57) ABSTRACT

A multi-function implement system for providing a single implement that has a plurality of configurations. The multi-function implement system generally includes a frame, a hitch extending from the frame for connecting to a tractor, a support shaft rotatably connected between opposing side members of the frame, and a plurality of implements attached to the support shaft. Rotation of the support shaft positions a selected implement in the lowered position thereby allowing the user to form a plurality of different implements from a single implement structure.

15 Claims, 10 Drawing Sheets

MULTI-FUNCTION IMPLEMENT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a farm implement and more specifically it relates to a multi-function implement system for providing a single implement that has a plurality of configurations.

2. Description of the Related Art

Any discussion of the related art throughout the specification should in no way be considered as an admission that such related art is widely known or forms part of common general knowledge in the field.

Conventional farm implements have been in use for years. Conventional farm implements are typically pulled behind a vehicle such as a tractor. Examples of farm implements utilized include but are not limited to grader blades, box blades, rakes, chisel plows, row cultivators, aerators, dethatchers, pluggers, seeders, spikers and the like. While these farm implements are suitable for their intended purpose, a farmer must purchase each of the implements individually which can be expensive to purchase, expensive to maintain and require a significant amount of storage space.

Because of the inherent problems with the related art, there is a need for a new and improved multi-function implement system for providing a single implement that has a plurality of configurations.

BRIEF SUMMARY OF THE INVENTION

The invention generally relates to a farm implement which includes a frame, a hitch extending from the frame for connecting to a tractor, a support shaft rotatably connected between opposing side members of the frame, and a plurality of implements attached to the support shaft. Rotation of the support shaft positions a selected implement in the lowered position thereby allowing the user to form a plurality of different implements from a single implement structure.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
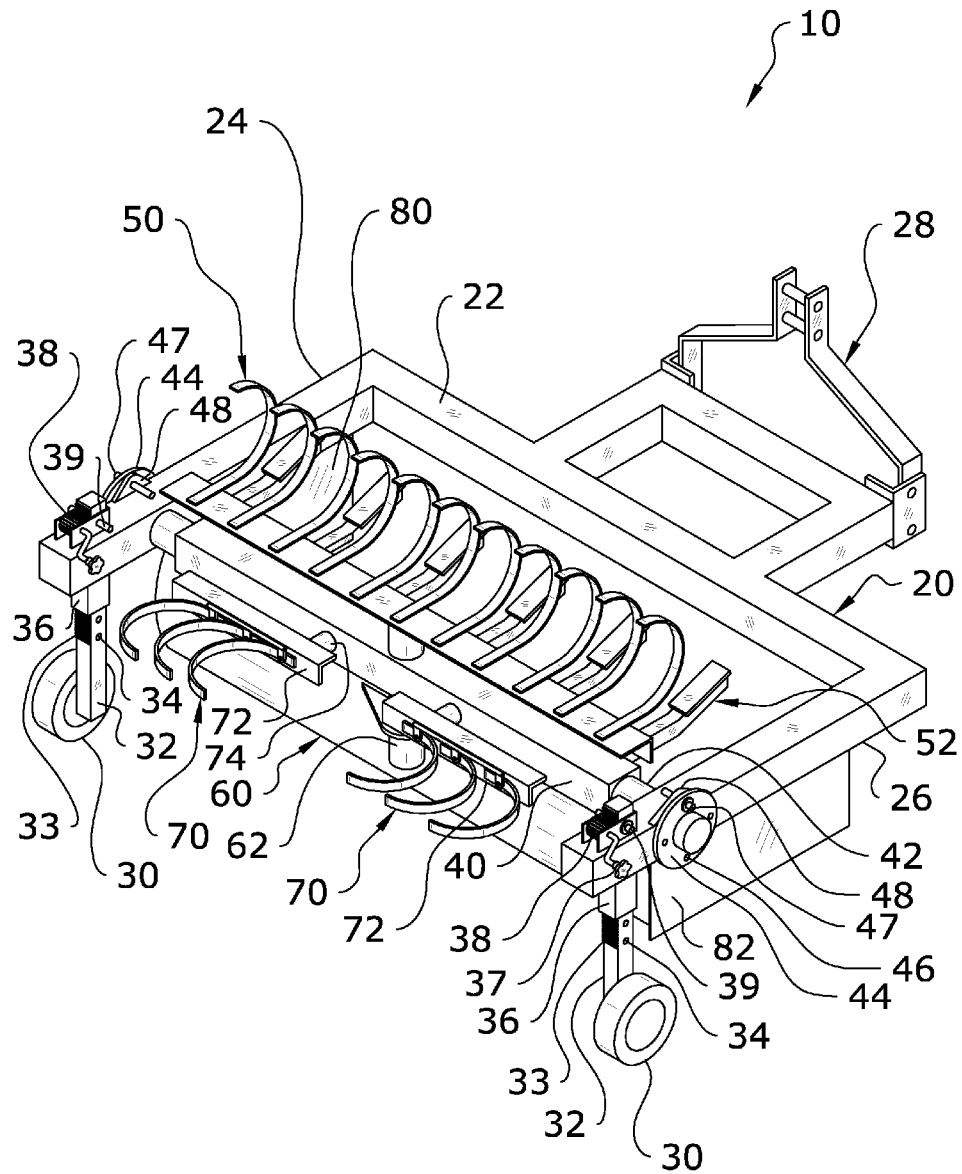
FIG. 1 is an upper perspective view of the present invention with the side panels lowered forming a box blade implement.

Turning now descriptively to the drawings, in which similar reference characters denote similar elements throughout the several views, FIGS. 1 through 10 illustrate a multi-function implement system 10, which comprises a frame 20, a hitch 28 extending from the frame 20 for connecting to a tractor or other vehicle, a support shaft 40 rotatably connected between opposing side members of the frame 20, and a plurality of implements 50, 52, 60, 70 attached to the support shaft 40. Rotation of the support shaft 40 positions a selected implement in the lowered position thereby allowing the user to form a plurality of different implements 50, 52, 60, 70 from a single implement structure. Examples of implements 50, 52, 60, 70 capable of being formed from the present invention include but are not limited to grader blades, box blades, rakes, chisel plows, row cultivators, aerators, dethatchers, pluggers, seeders, spikers and the like. The present invention may be utilized by farmers, landscapers, developers, golf courses, site grading contractors, home owners and the like.

B. Frame

FIGS. 1 through 10 illustrate the frame 20 adapted to support the plurality of implements 50, 52, 60, 70. The frame 20 may be comprised of various types of material such as but not limited to steel. The frame 20 may have various configurations capable of supporting the support shaft 40 in a rotatable manner.

As shown in FIGS. 1 through 5, the frame 20 preferably includes a front member 22, a first side member 24 extending rearwardly from a first end of the front member 22 and a second side member 26 extending rearwardly from a second end of the front member 22. The first side member 24 and the second side member 26 are parallel to one another. The first side member 24 and the second side member 26 preferably extend along a common horizontal plane with the front member 22.

C. Hitch

FIGS. 1 through 5 illustrate an exemplary hitch 28 extending from a front portion of the frame 20 for providing removable attachment of the present invention to a tractor or other vehicle. The hitch 28 may be comprised of various types of structures capable of connecting to a tractor including but not limited to a three-point structure.

D. Support Wheels

FIGS. 1 through 6 illustrate a plurality of support wheels 30 connected to a rear portion of the frame 20 to support the present invention during transportation from a work site to another work site. The support wheels 30 also provide for adjustment of the depth an implement 50, 52, 60, 70 is lowered with respect to the ground surface.

The plurality of support wheels 30 are each preferably adjustably connected to the frame 20 to allow for vertical adjustment of the plurality of support wheels 30. A rack and pinion adjustment assembly is preferably connected to each of the support wheels 30 to adjust the vertical position of the support wheels 30 with respect to the frame 20. The rack and pinion adjustment assembly is comprised of a support arm 32 slidably supported within a receiver sleeve 36 attached to the frame 20 in a vertical manner. The support arm 32 is connected to one of the support wheels 30 at a bottom end thereof. A rack gear 33 is attached to the support arm 32, and a pinion gear 38 is connected to the frame 20 to adjustably engage the rack gear 33 for lifting and lowering the support arm 32. A handle 37 is attached to the pinion gear 38 to allow for manual lifting and lowering of the support arm 32. It can be appreciated that a hydraulic actuator may be connected between the frame 20 and the support arms 32 to lift and lower the support arms 32.

Figure 2:
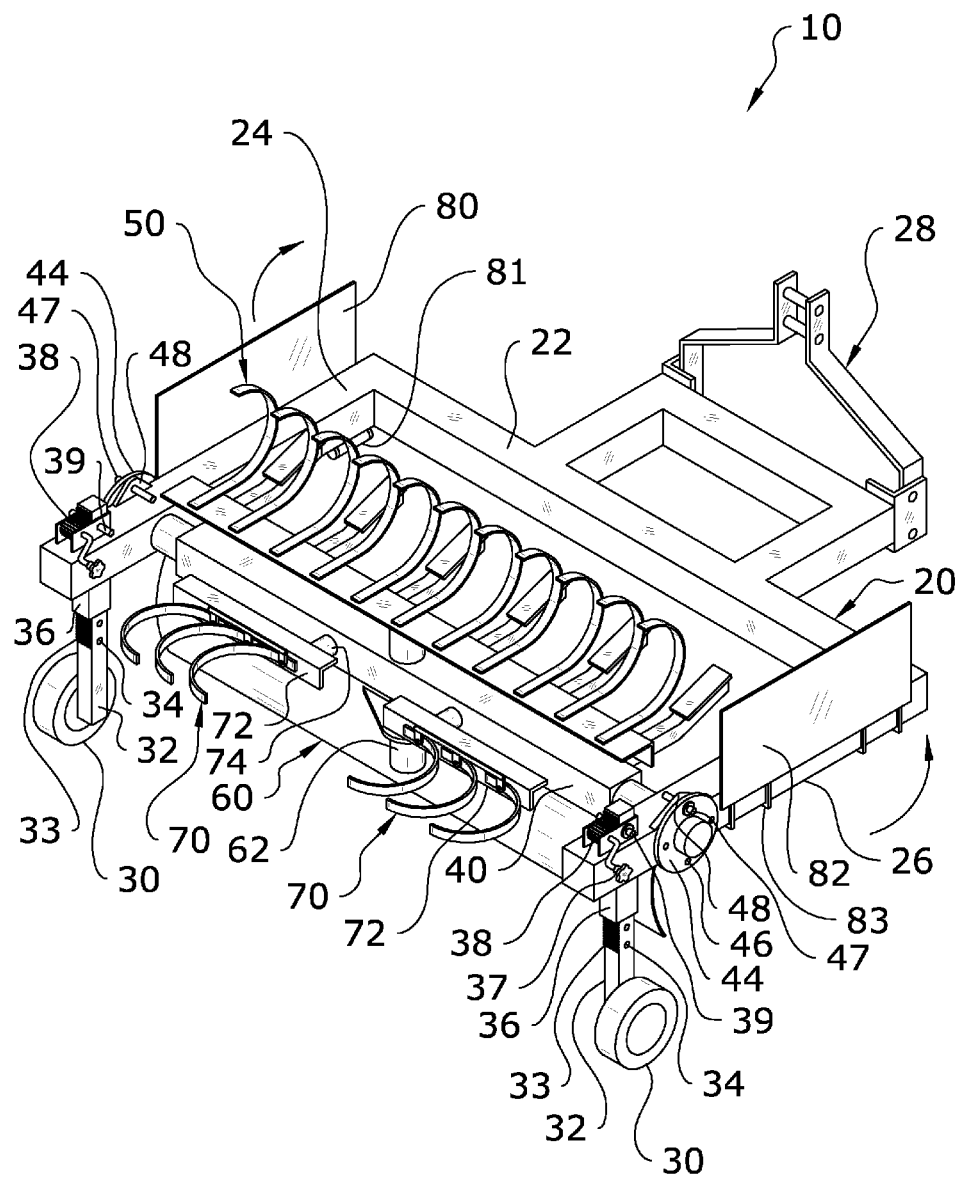
FIG. 2 is an upper perspective view of the present invention with the side panels elevated forming a grader blade implement.
Figure 3:
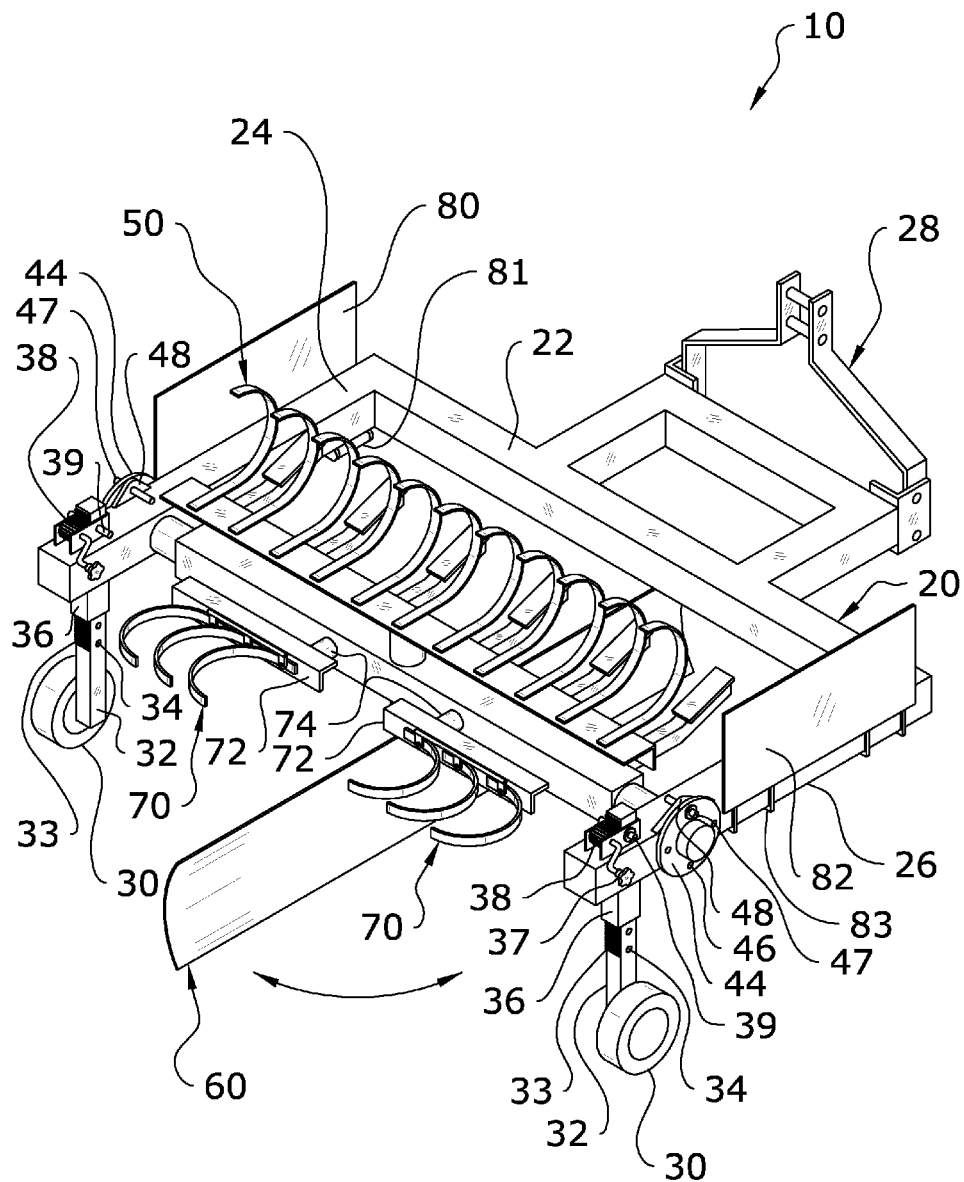
FIG. 3 is an upper perspective view of the present invention showing the grader blade being rotated.

A plurality of alignment apertures 34 preferably extend through each support arm 32 as illustrated in FIGS. 1, 2, 3, 7, 8, 9. As best illustrated in FIGS. 1 through 3, a locking member 39 selectively extends through a selected alignment aperture and the frame 20 to lock the support arm 32 in a selected position. The locking member 39 may extend through a hole within the side member 24, 26 directly or through a bracket extending from the frame 20.

E. Support Shaft

Figure 4:
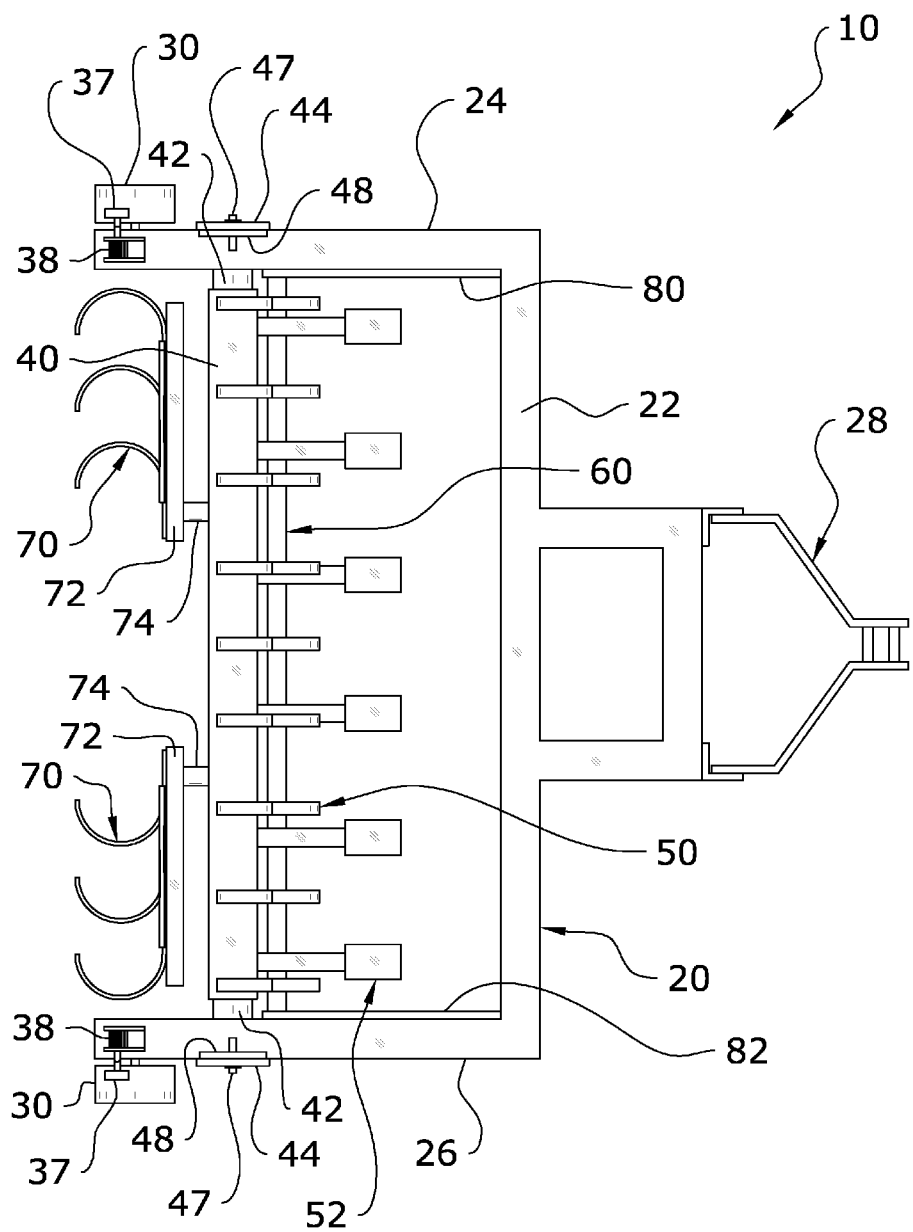
FIG. 4 is a top view of the present invention.
Figure 5:
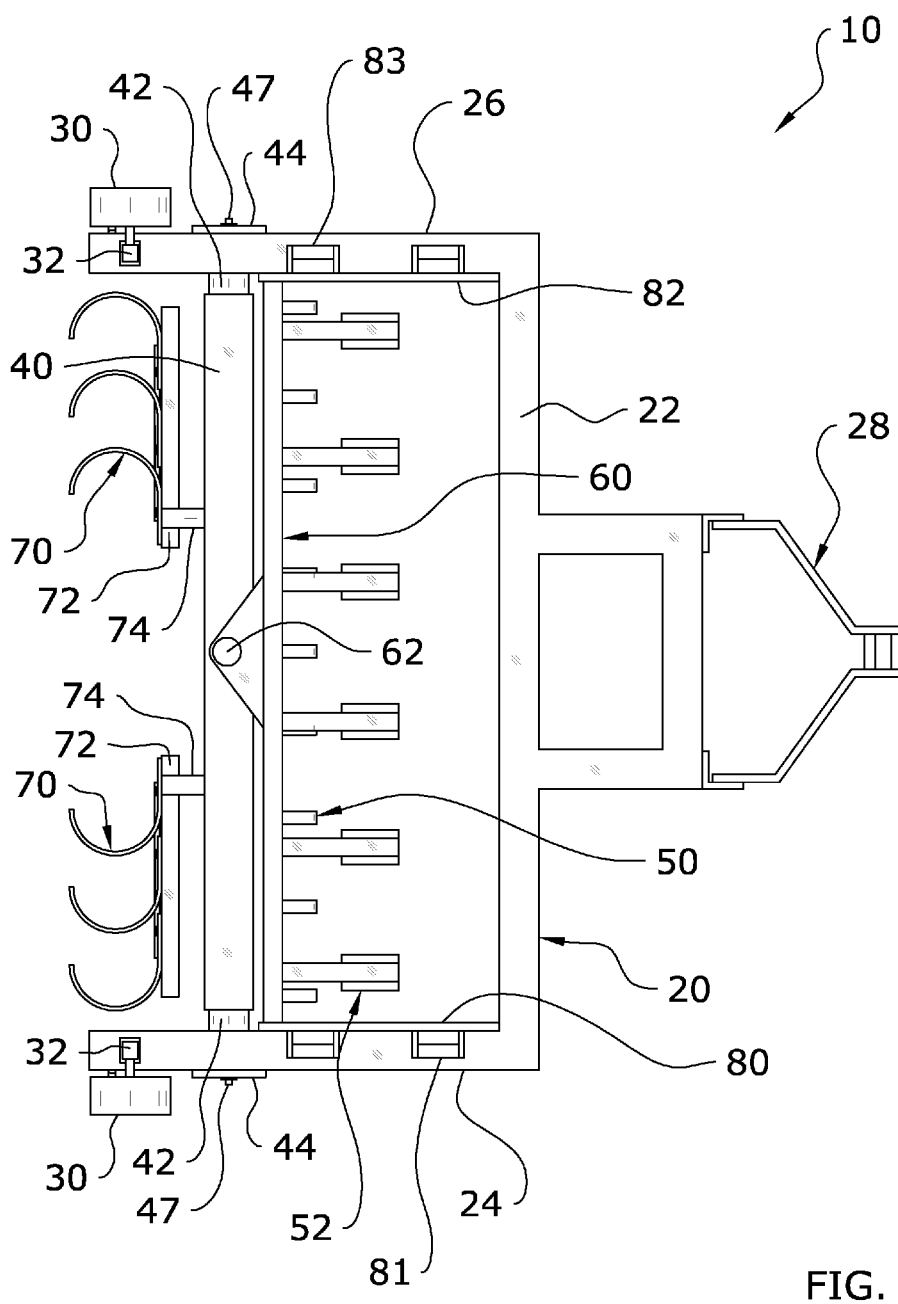
FIG. 5 is a bottom view of the present invention.
Figure 6:
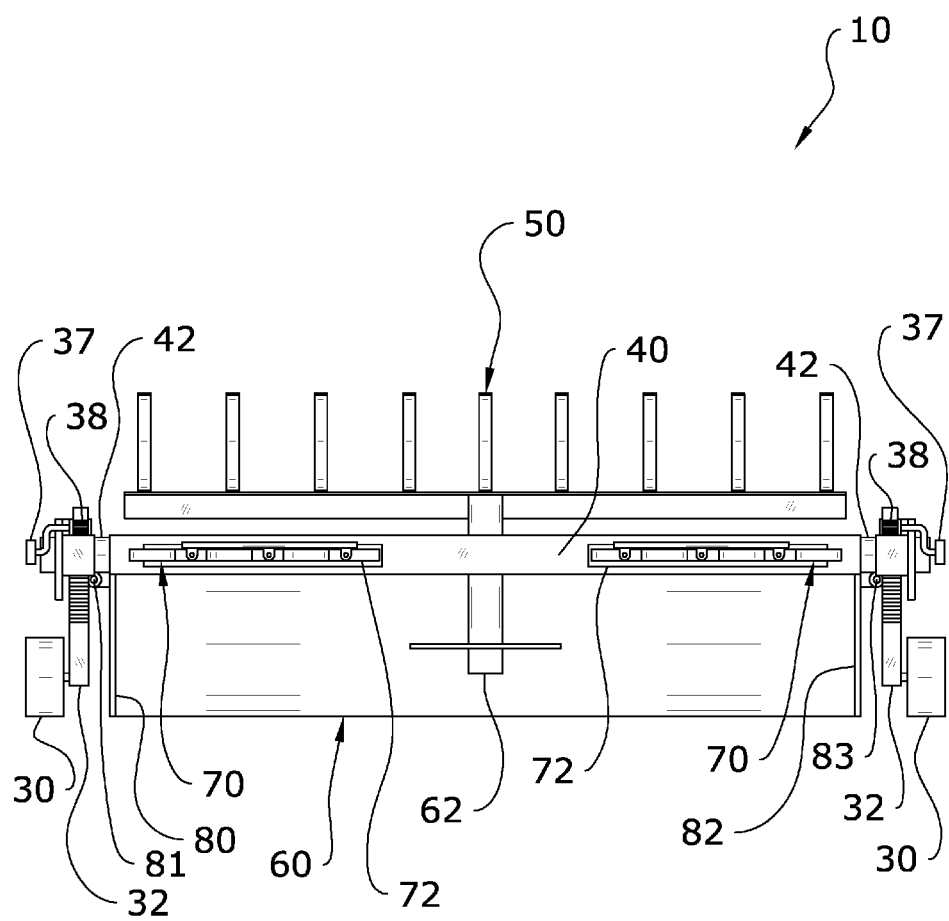
FIG. 6 is a rear view of the present invention.
Figure 7:
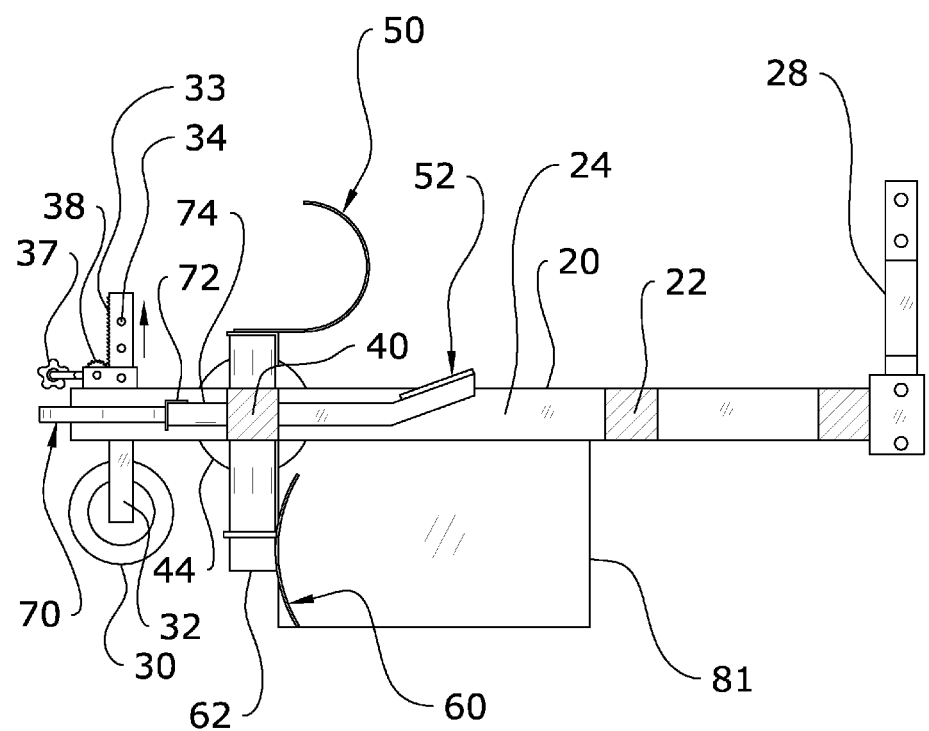
FIG. 7 is a side cutaway view of the present invention in the box blade implement mode.

The support shaft 40 is rotatably connected between the first side member 24 and the second side member 26 as illustrated in FIGS. 1 through 6 of the drawings. The support shaft 40 is transverse with respect to a forward path of the frame 20 as illustrated in FIGS. 4 and 5 of the drawings. The support shaft 40 includes an axle 42 at opposing ends that rotatably extends through the frame 20 at opposing ends of the axle 42. The support shaft 40 may have a square or rectangular cross sectional area to assist in connecting the various implements 50, 52, 60, 70.

The support shaft 40 is adapted to be locked in a plurality of rotational locations that correspond with the plurality of implements 50, 52, 60, 70 to retain the selected implement in the lowered position for engagement with the ground surface. At least one locking plate 44 is preferably attached to the support shaft 40 as illustrated in FIGS. 1 through 6 of the drawings. The locking plate 44 preferably extends outwardly from the support shaft 40 in a radial manner. The locking plate 44 includes a plurality of locking apertures 46 that correspond to the plurality of implements.

For example, when four implements 50, 52, 60, 70 are utilized as shown in the drawings, four locking apertures 46 are preferably utilized wherein each of the locking apertures 46 corresponds to one of the implements 50, 52, 60, 70. A locking fastener 47 is extendable through one of the locking apertures 46 and the frame 20 to retain the selected implement in the lowered position. At least one locking bracket 48 preferably extends from the frame 20 adjacent to the locking plate 44 and the locking fastener 47 extends through an aperture within the locking bracket 48 to prevent rotation of the locking plate 44 (and to prevent rotation of the support shaft 40).

F. Implements

FIGS. 1 through 10 illustrate the plurality of implements 50, 52, 60, 70 attached to the support shaft 40, wherein rotation of the support shaft 40 positions a selected implement in a lowered position for operation of the selected implement. The plurality of implements extend radially from the support shaft 40 as illustrated in FIGS. 7 through 10 of the drawings.

The plurality of implements are preferably comprised of four implements which allows for ninety-degrees of separation between each of the implements. It can be appreciated that 2, 3, 4, 5, 6 or more implements 50, 52, 60, 70 may be attached to the support shaft 40 assuming there is sufficient room upon the support shaft 40.

Examples of implements 50, 52, 60, 70 suitable for attachment to the support shaft 40 include but are not limited to grader blades, box blades, rakes, chisel plows, row cultivators, aerators, dethatchers, pluggers, seeders, spikers and the like. FIGS. 7 through 10 illustrate the implements 50, 52, 60, 70 comprised of a chisel plow, a blade, a rake and a row cultivator to provide an illustration of the potential configurations for the present invention and the operation of the present invention by rotating the support shaft 40.

Figure 8:
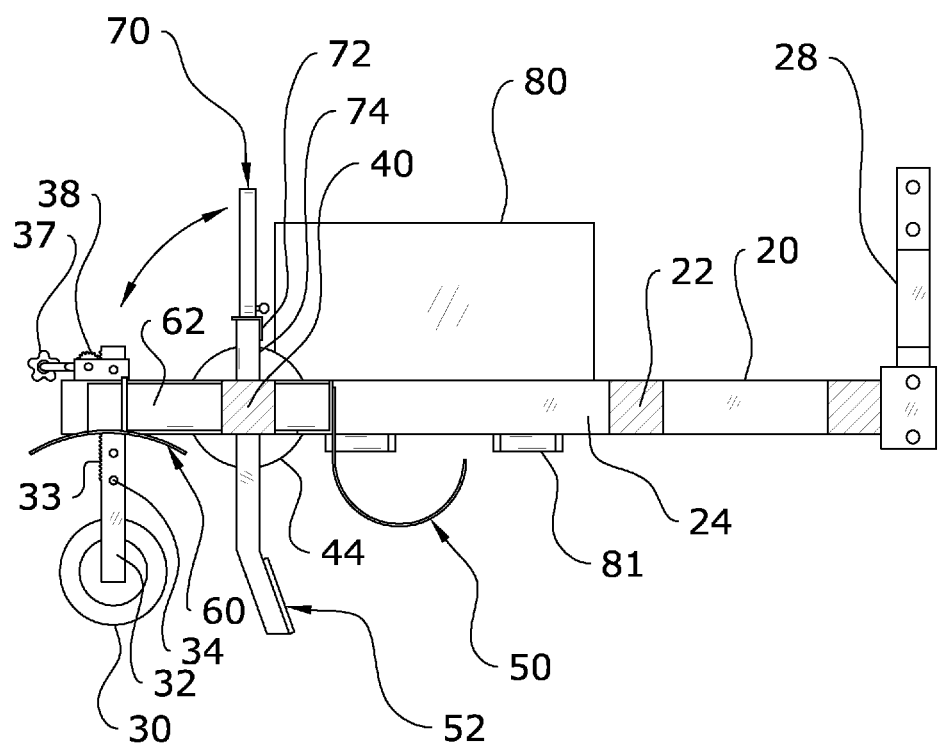
FIG. 8 is a side cutaway view of the present invention in the chisel plow implement mode.
Figure 9:
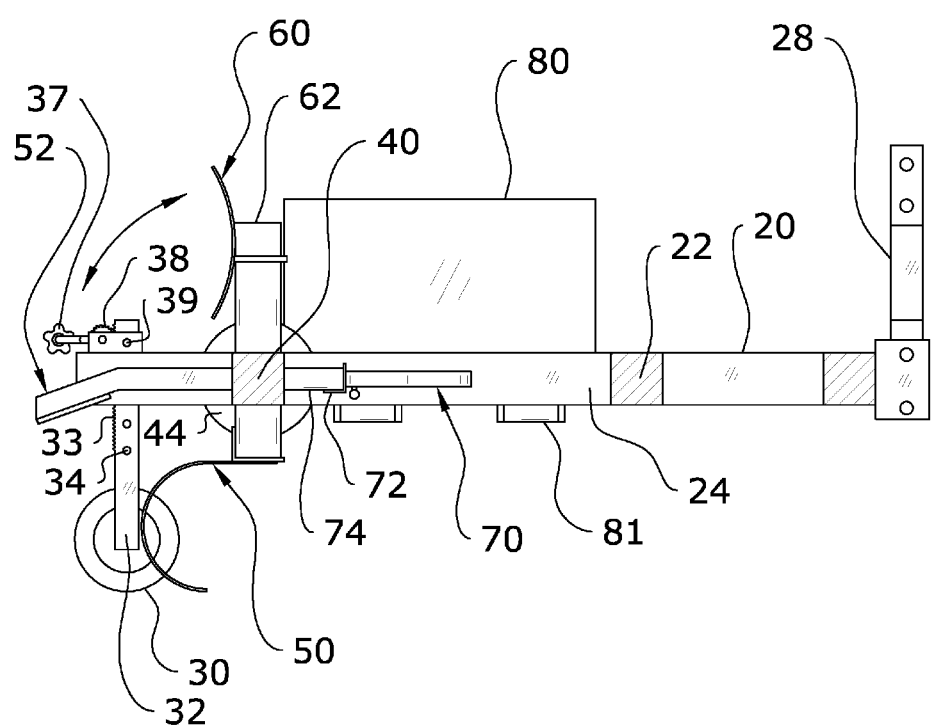
FIG. 9 is a side cutaway view of the present invention in the rake implement mode.

As illustrated in FIGS. 1, 2, 3, 9 of the drawings, the first implement 50 may be comprised of gravel/debris rake attached to a first side of the support shaft 40. As illustrated in FIGS. 4, 5, 8 of the drawings, the second implement 52 may be comprised of a chisel plow attached to a second side of the support shaft 40 at an angle of ninety-degrees with respect to the first implement 50.

As illustrated in FIGS. 1, 2, 3, 6, 7 of the drawings, the third implement 60 may be comprised of a blade that is pivotally attached to the third side of the support shaft 40 by a center pivot joint 62 that allows for the pivoting of the blade about a vertical axis to provide for a grader blade implement (when the side panels 80, 82 are up as shown in FIG. 3) or a box grader (when the side panels 80, 82 are down as shown in FIG. 2). The first side panel 80 is pivotally connected to the first side member 24 by a first hinge 81 and the second side panel 82 is pivotally connected to the second side member 26 by a second hinge 83. The first side panel 80 and the second side panel 82 may be lowered in combination with one of the plurality of implements comprised of a blade to form a box grader as illustrated in FIG. 2 of the drawings. The first side panel 80 and the second side panel 82 are preferably adapted to be lockable in the lowered position (FIG. 1) or the upright position (FIGS. 2, 3). The side panels may be locked into either position utilizing a conventional locking assembly such as a locking pin.

Figure 10:
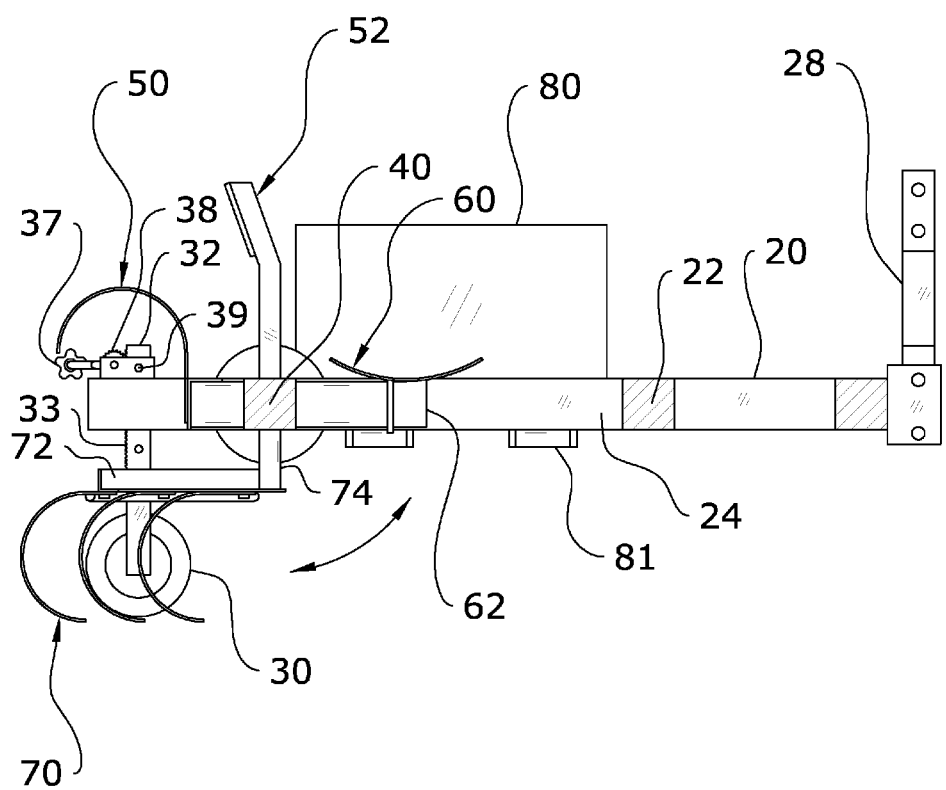
FIG. 10 is a side cutaway view of the present invention in the cultivator implement mode.

The fourth implement 70 may be comprised of a pair of row cultivators each attached to an extended arm 72, wherein the extended arm 72 is attached to the fourth side of the support shaft 40 by an offset pivot joint 74 (the row cultivators are aligned with the support shaft 40 when not in use as illustrated in FIGS. 1 through 3 and the row cultivators are transverse with the support shaft 40 when in use as illustrated in FIG. 10 of the drawings).

G. Operation of Preferred Embodiment

In use, the user connects the hitch 28 to a tractor and determines the type of implement they want to utilize the present invention for. For example, if the user decides they want to utilize the present invention as a box grader, the user lowers the side panels 80, 82 into the lowered lock position and then rotates the support shaft 40 so that the third implement 60 comprised of a blade is lowered into the lowered position (with the blade positioned transverse with respect to the forward path of the frame 20). The user then secures the locking fastener 47 through a locking aperture within the locking plate 44 and an aperture within the locking bracket 48 to prevent rotation of the support shaft 40 (this is repeated on the other side of the support shaft 40 if a pair of locking plates 44 are used). The user then adjusts the vertical height of the support wheels 30 by rotating the handles 37 and locks the same to allow for a desired level of engagement of the ground surface with the blade. The user then operates the present invention as a conventional box grader by pulling the same forwardly with the tractor. This process may be repeated for various other implements 50, 52, 60, 70 as desired by the user. When finished, the user simply disconnects the hitch 28 from the tractor for storage of the present invention.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A multi-function implement, comprising:
   a frame having a first side member and a second side member;
   a hitch extending from a front portion of said frame;
   a support shaft rotatably connected between said first side member and said second side member;
   a plurality of implements attached to said support shaft, wherein rotation of said support shaft positions a selected implement in a lowered position for operation of said selected implement;
   a first side panel pivotally connected to said first side member by a first hinge and a second side panel pivotally connected to said second side member by a second hinge, wherein said first side panel and said second side panel may be lowered in combination with one of said plurality of implements comprised of a blade to form a box grader;
   a plurality of alignment apertures extending through said support arm and a locking member, wherein said locking member selectively extends through a selected alignment aperture of said plurality of alignment apertures and said frame to lock said support arm in a selected position;
   a locking plate attached to said support shaft, wherein said locking plate includes a plurality of locking apertures that correspond to said plurality of implements, and a locking fastener extendable through one of said plurality of locking apertures and said frame to retain said selected implement in said lowered position; and
   a locking bracket extending from said frame, wherein said locking fastener extends through an aperture within said locking bracket.

2. The multi-function implement of claim 1, wherein said plurality of implements extend radially from said support shaft.

3. The multi-function implement of claim 1, wherein said support shaft is transverse with respect to a forward path of said frame.

4. The multi-function implement of claim 1, wherein said plurality of implements are comprised of four implements.

5. The multi-function implement of claim 4, wherein said four implements extend outwardly approximately ninety-degrees from an adjacent implement attached to said support shaft.

6. The multi-function implement of claim 1, wherein said plurality of implements include a chisel plow.

7. The multi-function implement of claim 1, wherein said plurality of implements include a rake.

8. The multi-function implement of claim 1, wherein said plurality of implements are comprised of a chisel plow, the blade, a rake and a row cultivator.

9. The multi-function implement of claim 1, including a plurality of support wheels connected to a rear portion of said frame.

10. The multi-function implement of claim 9, wherein said plurality of support wheels are adjustably connected to said frame to allow for vertical adjustment of said plurality of support wheels.

11. The multi-function implement of claim 10, including a rack and pinion adjustment assembly connected to at least one of said plurality of support wheels to adjust the vertical position of said plurality of support wheels.

12. The multi-function implement of claim 11, wherein said rack and pinion adjustment assembly is comprised of a support arm slidably supported within said frame in a vertical manner and connected to one of said plurality of support wheels, a rack gear attached to said support arm, and a pinion gear connected to said frame to adjustably engage said rack gear for lifting and lowering said support arm.

13. The multi-function implement of claim 1, wherein said support shaft is adapted to be locked in a plurality of rotational locations that correspond with said plurality of implements to retain said selected implement in said lowered position.

14. The multi-function implement of claim 1, wherein said support shaft includes an axle that rotatably extends through said frame at opposing ends of said axle.

15. A multi-function implement, comprising:
   a frame having a first side member and a second side member;
   a hitch extending from a front portion of said frame;
   a support shaft rotatably connected between said first side member and said second side member, wherein said support shaft is transverse with respect to a forward path of said frame;
   a plurality of implements attached to said support shaft, wherein rotation of said support shaft positions a selected implement in a lowered position for operation of said selected implement;
   wherein said plurality of implements extend radially from said support shaft;
   wherein said plurality of implements are comprised of four implements, wherein said four implements extend outwardly approximately ninety-degrees from an adjacent implement attached to said support shaft;

wherein said plurality of implements are comprised of a chisel plow, a blade, a rake and a row cultivator;

a first side panel pivotally connected to said first side member by a first hinge and a second side panel pivotally connected to said second side member by a second hinge, wherein said first side panel and said second side panel may be lowered in combination with one of said plurality of implements comprised of a blade to form a box grader;

a plurality of support wheels connected to a rear portion of said frame, wherein said plurality of support wheels are adjustably connected to said frame to allow for vertical adjustment of said plurality of support wheels;

a rack and pinion adjustment assembly connected to at least one of said plurality of support wheels to adjust the vertical position of said plurality of support wheels, wherein said rack and pinion adjustment assembly is comprised of a support arm slidably supported within said frame in a vertical manner and connected to one of said plurality of support wheels, a rack gear attached to said support arm, and a pinion gear connected to said frame to adjustably engage said rack gear for lifting and lowering said support arm;

a plurality of alignment apertures extending through said support arm and a locking member, wherein said locking member selectively extends through a selected alignment aperture of said plurality of alignment apertures and said frame to lock said support arm in a selected position;

wherein said support shaft is adapted to be locked in a plurality of rotational locations that correspond with said plurality of implements to retain said selected implement in said lowered position;

a locking plate attached to said support shaft, wherein said locking plate includes a plurality of locking apertures that correspond to said plurality of implements, and a locking fastener extendable through one of said plurality of locking apertures and said frame to retain said selected implement in said lowered position; and a locking bracket extending from said frame, wherein said locking fastener extends through an aperture within said locking bracket.

* * * * *